(12) United States Patent
Orlov et al.

(10) Patent No.: US 11,314,825 B2
(45) Date of Patent: Apr. 26, 2022

(54) MACHINE-LEARNING BASED PERSONALIZATION

(71) Applicant: Sitecore Corporation A/S, Copenhagen V (DK)

(72) Inventors: Aleksandr A. Orlov, Copenhagen (DK); Tetiana Kostenko, Frederiksberg C (DK)

(73) Assignee: SITECORE CORPORATION A/S, Copenhagen (DK)

( * ) Notice: Subject to any disclaimer, the term of this patent is extended or adjusted under 35 U.S.C. 154(b) by 424 days.

(21) Appl. No.: 16/281,803

(22) Filed: Feb. 21, 2019

(65) Prior Publication Data

US 2020/0272672 A1  Aug. 27, 2020

(51) Int. Cl.
| | |
|---|---|
| *G06F 40/00* | (2020.01) |
| *G06F 16/9535* | (2019.01) |
| *G06K 9/62* | (2022.01) |
| *G06F 16/958* | (2019.01) |
| *G06N 20/00* | (2019.01) |

(52) U.S. Cl.
CPC ........ *G06F 16/9535* (2019.01); *G06F 16/958* (2019.01); *G06K 9/6282* (2013.01); *G06N 20/00* (2019.01)

(58) Field of Classification Search
CPC .................................................. G06F 16/958
See application file for complete search history.

(56) References Cited

U.S. PATENT DOCUMENTS

| | | | | |
|---|---|---|---|---|
| 9,984,386 | B1 * | 5/2018 | Bhatia | G06Q 30/0241 |
| 2012/0042025 | A1 * | 2/2012 | Jamison | G06Q 10/107 |
| | | | | 709/206 |
| 2014/0075336 | A1 * | 3/2014 | Curtis | G06F 3/0481 |
| | | | | 715/753 |
| 2017/0371856 | A1 * | 12/2017 | Can | G06K 9/3233 |
| 2018/0114139 | A1 * | 4/2018 | Kucera | G06Q 30/0269 |

(Continued)

OTHER PUBLICATIONS

Wikipedia Data pre-processing (retrieved from https://web.archive.org/web/20190112134917/https://en.wikipedia.org/wiki/Data_pre-processing, archived Jan. 12, 2019, 1 page) Jan. 2019 (Year: 2019).*

(Continued)

*Primary Examiner* — Scott T Baderman
*Assistant Examiner* — Barbara M Level
(74) *Attorney, Agent, or Firm* — Gates & Cooper LLP

(57) ABSTRACT

A system, method, and apparatus provide the ability to generate and deliver personalized digital content. Multiple content tests are performed by presenting different variants of content to a set of different consumers of one or more consumers. A machine learning (ML model is generated and trained based on an analysis of results of the multiple content tests. Based on the ML model, personalization rules, that specify a certain variance for a defined set of facts, are output. The personalization rules are exposed to an administrative user who selects one or more of the personalization rules. A request for content is received from a requesting consumer. Based on similarities between the defined set of facts and the requesting consumer, a subset of the selected personalization rules are selected. The content is personalized and delivered to the requesting consumer based on the further selected personalization rules.

20 Claims, 9 Drawing Sheets

(56) References Cited

U.S. PATENT DOCUMENTS

2018/0285770 A1\* 10/2018 Manikonda ............ G06N 7/005
2020/0302486 A1\* 9/2020 Ayoub ................... G06N 20/00

OTHER PUBLICATIONS

Wikipedia Data cleansing (retrieved from https://web.archive.org/web/20190112134917/https://en.wikipedia.org/wiki/Data_pre-processing, archived Jan. 12, 2019, 1 page) Jan. 2019 (Year: 2019).\*

Classification and Regression Trees for Machine Learning (https://web.archive.org/web/20190218134727/https://machinelearningmastery.com/classification-and-regression-trees-for-machine-learning, archived Feb. 18, 2019, 26 pages) Feb. 2019 (Year: 2019).\*

"Accuracy and precision", Wikipedia, pp. 1-6, https://en.wikipedia.org/wiki/Accuracy_and_precision, last edited on Nov. 8, 2018.

"Decision tree learning", Wikipedia, pp. 1-9, https://en.wikipedia.org/wiki/Decision_tree_learning#Gini_impurity, last edited on Jan. 31, 2019.

"Precision and recall", Wikipedia, pp. 1-7, https://en.wikipedia.org/wiki/Precision_and_recall, last edited on Nov. 3, 2018.

"CART®—Classification and Regression Trees—Data Mining And Predictive Analytics Software", pp. 1-3, https://www.salford-systems.com/products/cart, Copyright 1983-2018, as downloaded Nov. 15, 2018.

\* cited by examiner

MACHINE-LEARNING BASED PERSONALIZATION

CROSS-REFERENCE TO RELATED APPLICATIONS

This application is related to the following co-pending and commonly-assigned patent application, which application is incorporated by reference herein:

U.S. patent application Ser. No. 15/894,335, filed on Feb. 12, 2018, entitled "HEADLESS CONTENT MANAGEMENT SYSTEM (CMS)," with inventors Adam K. Weber, Nicholas J. Wesselman, Olexandr Shyba, and Michael Seifert, which application claims the benefit of provisional application 62/457,295 filed on Feb. 10, 2017.

BACKGROUND OF THE INVENTION

1. Field of the Invention

The present invention relates generally to content management systems (CMS), and in particular, to a method, system, apparatus, and article of manufacture for customization/personalization of content based on machine learning (ML).

2. Description of the Related Art

A content management system (CMS) is an application that is often used for the creation and modification of digital content. Web CMS (WCM or WCMS) is a CMS designed to support the management of web pages. Prior art systems have attempted to personalize web content. However, such prior art systems base such personalization on content tests and merely select a single result from such tests to present to the user. Further, such prior art systems fail to engage the user in determining how such content should be personalized while also failing to discover different variants for different audiences. Accordingly, what is needed is a method and system for personalizing content based on customer data, to discover audience segments, and suggest personalized content for such segments, while utilizing machine learning techniques.

To better understand the problems of the prior art, a description of prior art personalization processing may be useful.

FIG. 1 illustrates the logical flow for personalization in prior art systems. At step 102, a content test is started. In this regard, a user may create a content test on a page and selects the test objective (e.g., a goal or engagement value). Further, the test may have N different variants, that are competing against each other.

At step 104, the test is executed/in-progress. Any visitor to the page sees only one of the possible variants that are available. Statistics of the visits are accumulated and logged to a database in order to find the winner.

At step 106, the test is finished and the winning variant is determined. In this regard, the test may only be finished when there are a significant number of visits (e.g., a threshold number of visits has been completed). The winning variant is presented/picked to/by the user.

At step 108, the "winner" variant becomes the only variant that is presented on the web page delivered to the end-user/consumer.

In view of the above, in the prior art, a simple content test is used to suggest one single winner for all visitors. However, specific sub-segments within the entire audience may prefer different content (e.g., a sub-segment in a different geographic location may prefer certain content [e.g., different geographic areas may have preferences for certain products, trends, food, etc. and desire different content related to such preferences]). Accordingly, prior art personalization is limited in its ability to both discover personalization rules as well as presenting multiple variations of personalized content to consumers.

SUMMARY OF THE INVENTION

Embodiments of the invention overcome the problems of the prior art and discover user segments to personalize (e.g., discover personalization rules). In this regard, machine learning methodologies are employed, based on accumulated statistics of visits (e.g., customer's data), to discover audience segments and suggest/provide/generate personalized content for these segments. Through such personalization, embodiments of the invention attempt to maximize business goals such as visitor engagement, goal conversions, e-commerce purchases, and other types of conversions.

Competitive advantages of embodiments of the invention include maintainability and manageability, integration with existing systems, and the ability to leverage databases.

With respect to maintainability and manageability, while automated personalization products exist, such products focus on completely automated processes, which is a black box for a customer. Such an approach is a limitation to the completely automated system. In contrast, embodiments of the invention are provided with the ability to preview suggested personalization rules and if needed, personalization variants can be edited or dismissed. Accordingly, embodiments of the invention provide customers/users with more control over presentation, while at the same time supporting the decision making with machine learning.

With respect to integration with existing systems, prior art systems require the addition of custom code on a web page and calls to third party services in order to provide personalization. Such requirements result in increased latency and integration issues. In contrast, embodiments of the invention provide an integrated product suite in which personalization rules and customization are provided in a native format to the databases and services provided.

With respect to leveraging databases, embodiments of the invention may leverage an experience/customer database such as the XDB database available from the assignee of the present invention. Such a database provides behavioral profiles and engagement values thereby enabling unique customization/personalization compared to that of prior art systems. Further, the integration with such a database provides for end-to-end business optimization scenarios.

In addition to providing the personalization of content for websites, embodiments of the invention may be utilized in other channels, such as the personalization on the internet of things (IOT) channel (e.g., ATMs, smart refrigerators, etc.), mobile applications, and third-party based websites.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

Figure 1:
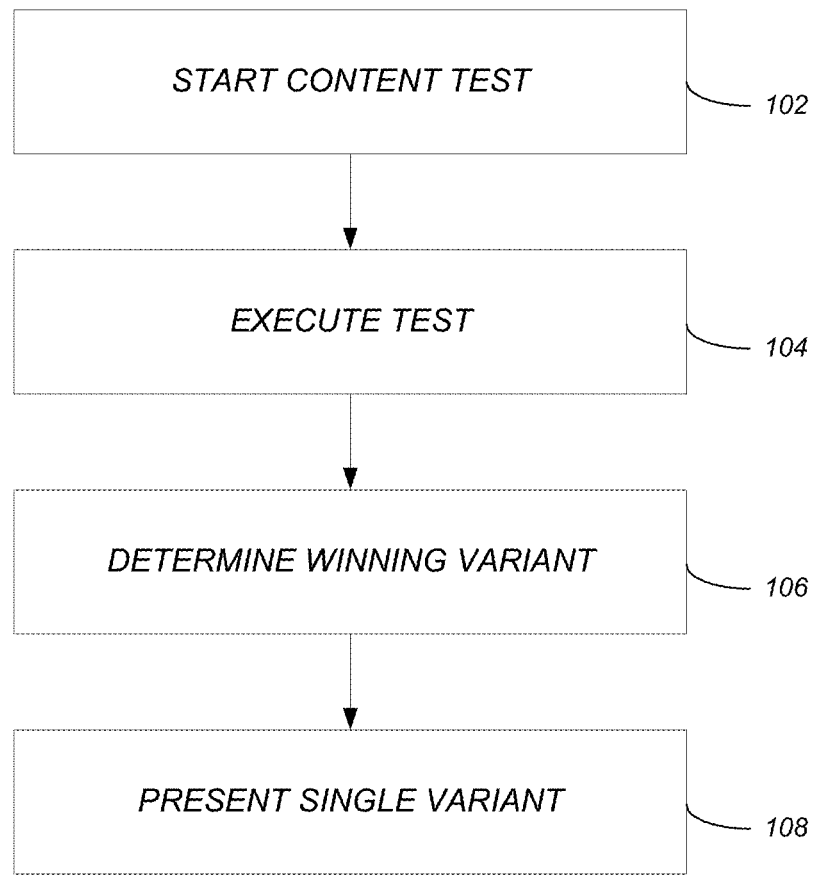
FIG. 1 illustrates the logical flow for personalization in prior art systems.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Embodiments of the invention combine CMS with deep customer-focused analytics available from a database. Such a database may collect, connect, and act on any information about an individual, from any channel in real time. In this regard, an experience database (xDB) (e.g., available from the assignee of the present invention) may provide a big data marketing repository that collects and connects visitor interactions to create a comprehensive, unified view of each individual visitor computer. Marketers may leverage the xDB to gain a holistic customer view not just from a website's interaction history but also from external apps, channels, devices, and data stores such as CRM (customer relationship management) and ERP (enterprise resource planning) systems. As described above, some prior art systems attempt to personalize content presented via a CMS to a visitor based on such databases and information. However, prior art systems are unable to easily discover which content/user segments to personalize. For example, prior art systems fail to easily/efficiently discover personalization rules. Embodiments of the invention overcome the problems of the prior art and utilize machine learning (ML) to discover/determine personalization rules and provide personalization experiences to consumers.

Further, embodiments of the invention may also be used to generate personalized content on channels other than websites/CRM systems. For example, embodiments of the invention may provide personalization on an internet of things channel such as for ATMs (automated teller machines), smart refrigerators, mobile applications, third-party websites, etc. To implement such personalization, some modification may be required on input data and content delivery, but the workflow described herein accommodates such personalization and generation of digital content.

Definitions

The following provides definitions for one or more terms used to describe embodiments of the invention.

Component

An entity used by operators (business users) to assemble Layouts. Each Component has a name, a type, various meta-data, and associated marketing content. Components can inherit from other Components. Components are not responsible for the final representation to the consumer, they are rather structural entities that control what to render, not how to render.

Variance

A set of marketing content and meta-data associated with a Component. For example, a Component called "Promo" can have more than one Variance. One variance may be "Autumn Promo", and another variance may be "Summer Promo", each specifying unique marketing content and different meta-data. In another example, one variance may be "teenager" and a different variance may be "elderly". In yet another example, in one location a particular variance may be preferred, while a different variance may be preferred in a different location. Variances enable personalization and multi-variate testing on the Component level.

Zones

Named areas on a given Layout. Zones expect Components to be placed by operators (business users) and may have restrictions as to what Components are expected to be placed there.

Layout

A composition of Zones and Components assembled by a Layout Engine based on a set of incoming parameters, personalization conditions and multi-variate testing. Layouts can also be built from Partial Layouts.

Partial Layout

A reusable fragment of a Layout that has one or many components. Partial Layouts are meant to be reused to compose Layouts.

Layout Engine

A program used by operators to compose Layouts from Components or Partial Layouts and by Client Applications to request content for Rendering to a Consumer. Therefore, Layout Engine works in two modes—layout authoring and layout delivery. A Graphical User Interface (GUI) is used for layout authoring by operators (business users) and non-GUI, Application programming interfaces (APIs) are used for layout delivery making it possible to consume the output of a Layout Engine by any technology. A Layout Engine is not responsible for Rendering of the layout in the final format, this is the responsibility of the Client Application.

Client Application

The program that the Consumer (end-user) is interacting with. This program issues requests to the Layout Engine via Application programming interfaces (APIs) and is responsible for the Rendering of the retrieved layout in the technology specific to the hosting environment where the program executes. For example, if the client application is a web application and the hosting environment is a web browser, then the technology may likely utilize HTML (hypertext markup language). Accordingly, the client application is responsible for utilizing any technology that produces HTML from the machine-readable output coming from the Layout Engine. For example, if the hosting environment is a wearable device, the technology could be the proprietary User Interface technology that is used for Rendering.

Visual Representation

Each Component can have one or many visual representations that specify how a Component is supposed to be Rendered. For example, a "Promo" component can have two or more visual representations that control look and feel for a component: "Featured Promotion" and "Teaser Promotion".

Rendering

The process of taking structured (machine-readable) Layout Engine output and representing it in a Graphical User Interface depending on the technology available within the hosting environment of a Client Application (HTML, Holograms, native device GUI library, etc.).

Marketing Content Database

A database that stores content that is associated with a component during layout composition and is used to store the composed layout.

Consumer Behavior Database

A database that stores all prior history of visitor interaction including behavior and profile information. This database is used for personalization on the Component level.

Personalization

The process of transforming the output of the Layout Engine per each request coming from a Client Application. This may include explicit and implicit parameters of each request.

Multi-Variate Testing

The process of finding the most optimal combination of Variants for a number of Components.

Personalization Logical Flow

Figure 2:
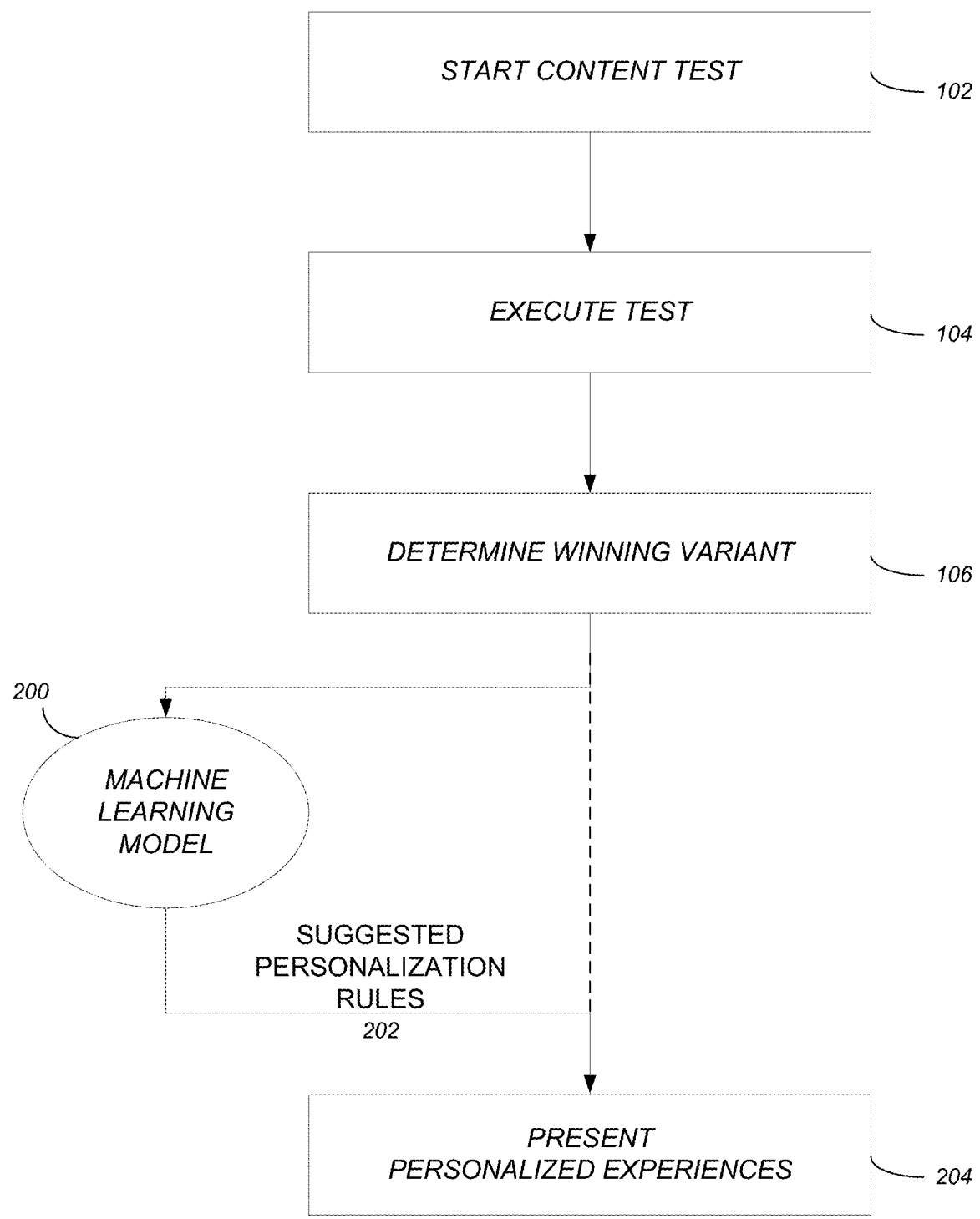
FIG. 2 illustrates the logical flow for personalizing content in accordance with one or more embodiments of the invention.

FIG. 2 illustrates the logical flow for personalizing content in accordance with one or more embodiments of the invention.

The first three steps of FIG. 2 are similar to that of FIG. 1. At steps 102 and 104 multiple content tests are performed by presenting different variants of content to a set of different consumers (e.g., of one or more consumers). At step 106, when there are significant number of visits in the test (e.g., a threshold number of tests/results have been conducted/collected), the test may be finished. A winning variant may be determined. However, the logical flow differs from step 104 forward.

After step 106, the accumulated statistics (i.e., analysis of results of the multiple content tests) are utilized to generate and (further) train the machine learning (ML) model 200, and suggested personalization rules 202 are output. For example, the ML model 200 may compare predicted values for personalized experiences with the selected/winning variant at 106. Results of the multiple content tests may be collected and include a mapping from input variables to target variables. The results may be pre-processed by transforming (e.g., transforming results into a different form to optimize results for computing performance), normalizing (e.g., numeric values), and cleaning and filtering (e.g., reducing data by removing duplicate mappings and attributes with shared values) the collected results on a per mapping basis. Further, a minimum/threshold number of results/tests may be accumulated prior to conducting the preprocessing. In addition, as described in further detail below, the ML model 200 may utilize a classification and regression tree (CART) that is built based on the test results. Each node of the CART may include input variables and output data, and nodes of the CART are partitioned based on an evaluation of split points determined by the input variables.

For example, visitors from Denmark may have visited 25 specific pages from a web site and triggered specific goals on a particular afternoon. Moving forward, the content may be personalized based on such specific facts/fact patterns/information. The ML model 200 analyzes such information to determine certain variances that work better and/or were preferred, and suggests such variants as a personalization rule. In this regard, each personalization rule specifies a certain variance for a defined set of facts.

At step 204, suggested personalization variants/rules (as determined by the ML module 200) are presented to the user (e.g., an administrative user). The user may also pick/select the winning variant and any number of the suggested personalization rules 202.

At step 204, the selected winning variant may be used as the default on the page/content. Further, in step 204, the other variants may be applied as personalized experiences. Thus, instead of a single variant (as in the prior art), different variants are available depending on what is optimal. In other words, once a request for content from a requesting consumer (of one or more consumers) is received, personalization rules are further selected based on the similarities between the requesting consumer and the defined set of facts. Thereafter, personalized content is delivered to the requesting consumer based on the selected personalization rules. In one or more embodiments, the content delivery consists of publishing a website that is personalized based on the requesting consumer. In alternative embodiments, the content may be personalized and delivered via different content delivery mechanisms (e.g., via short message service (SMS), applications (apps), content streaming, etc.

Figure 3:
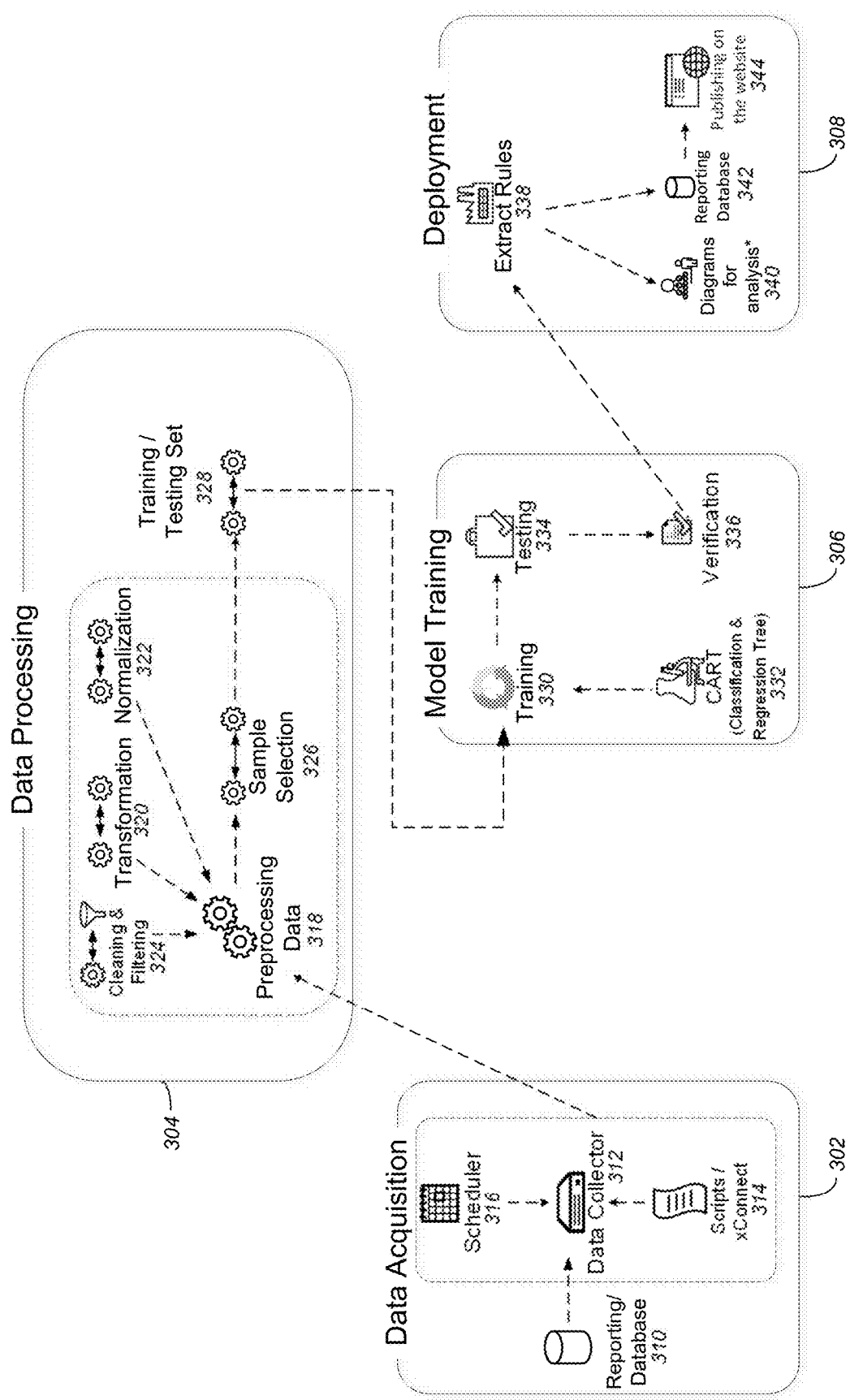
FIG. 3 illustrates an architectural view for personalizing content in accordance with one or more embodiments of the invention.

FIG. 3 illustrates an architectural view for personalizing content in accordance with one or more embodiments of the invention. The primary steps provide for data acquisition 302, data processing 304, model training 306, and deployment 308. Comparing FIG. 2 to FIG. 3, the data acquisition component 302 may perform the start and execution steps 102 and 104 (with some differences). The data processing component 304 and the model training component 306 may be used to conduct steps 200-206 of FIG. 2, and the deployment component 308 may conduct the presentation of personalized experiences step 208. A description of each component and the steps performed by the components follow.

Stage 1: Data Acquisition 302

The data acquisition component 302 provides the ability to actually acquire and format the data as necessary. In this regard, raw data from a database 310 (e.g., a proprietary database such as the XCONNECT database available from SITECORE), may be formatted into a readable format via data collector 312. The data collector 312 may be controlled/initialized/triggered to collect/convert data from database 310 via scripts/XCONNECT API/commands 314 or a scheduler 316 (e.g., that initializes data collection at a regular/irregular specific date/time/interval, etc.).

For example, raw data from database 310 may be converted/formatted into a two-dimensional (2D) table aggregated by contact with two columns. A first column may include all of the input variables/factors and the second column may be the target variable:

First Column: All the input variables/factors:
  test combination exposed;
  campaigns, goals, events, outcomes triggered before the test;

value earned before exposure; and
etc.

Second Column: Target variable, which is the same as the test objective, for example, one of the following:

Whether the target goal has been triggered or not; and/or

Accumulated Value after the exposure.

In addition, if the "test objective" is a goal, the same goal may be present in both columns in the resulting dataset: as a previously triggered goal (input column) and as the test objective (e.g., with different values) (in the target output column). At this point, data may be stored in the converted data in a raw or readable data format, for example:

Goal, Event, Outcome—type: bool, values: FALSE—not triggered, TRUE—triggered

Visit Number, Value—type: int, values: 0—no data (empty field in XCONNECT), N/A—data is missing (in XCONNECT recorded N/A), some number Behaviour Pattern—type: GUID, value: GUID—if present, FALSE—if not present, N/A—data is missing Stage 2: Data Processing 304

Figure 4:
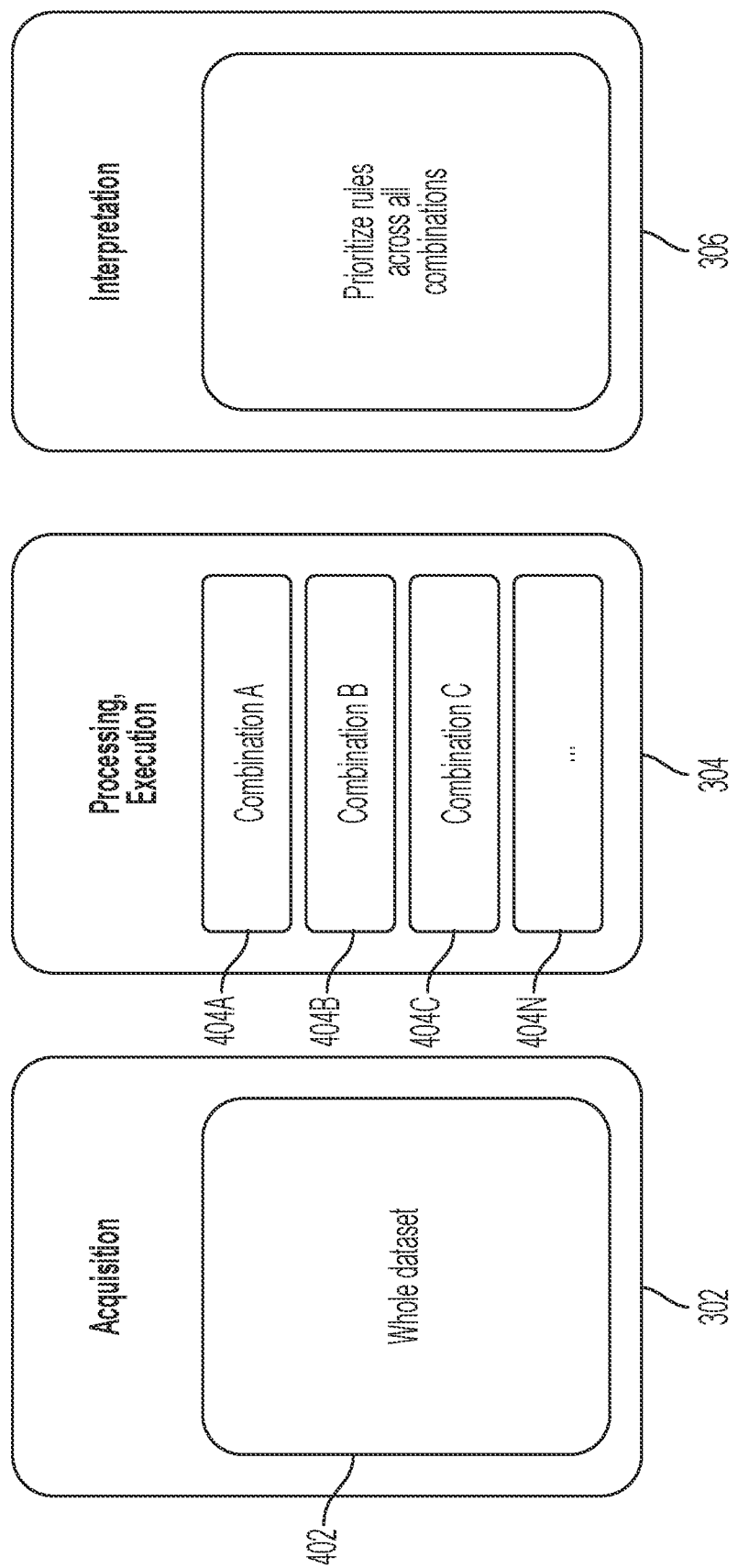
FIG. 4 illustrates a further overview for creating the personalization rules in accordance with one or more embodiments of the invention.

The data processing 304 of data acquired 302 as well as the model training 306 should take place for each test combination separately. FIG. 4 illustrates a further overview for creating the personalization rules in accordance with one or more embodiments of the invention. The description herein refers to both FIG. 3 and FIG. 4.

During data acquisition 302, the entire/whole dataset 402 is acquired. Before entering the data processing step 304, the input dataset 402 may be split by test combination 404A, 404B, 404C, to 404N, and the rows that belong to the winning combination may be ignored. In this regard, the winning combination may only be for comparing and prioritizing. Further, the data processing 304 may be conducted for each test combination 404A-404N separately.

During data processing 304, the whole data set 402 may be preprocessed at 318 (e.g., on a per test/row basis). Such preprocessing 318 may include "transformation" 320, "normalization" 322, and "cleaning & filtering" 324 operations. In other words, the transformation 320 and normalization 322 operations transform and normalize the data into a readable format, while the cleaning and filtering operation 324 determines the desired combination 404A-404N to perform the processing 304 on. Once the preprocessing 318 has completed, it means that data acquisition 302 is finished, and the raw/whole original dataset 402 will not change thereafter (e.g., in the next second).

Further, it is useful to only start data processing 304 once the whole data set 402 is completely acquired so that the tests used during data acquisition 302 achieve significant results first. Otherwise (i.e., if processing 304 begins before the whole dataset 402 is acquired), the winning combination may not be known, and there is no data to use as the benchmark for classification of outputs from other test combinations. Additionally, as one or more of the tests may be insignificant, there may not be any need to create rules (e.g., for such insignificant tests).

If universal processing is not being created/conducted (e.g., that can subsequently be used in other modules), then some data processing may be performed during data acquisition 302. In addition, some embodiments of the invention may require some extra data processing 304. In other words, the actual processing pipeline may be tied to the particular methodology used.

During data processing 304, the order of operations may provide for Filtering first, then Cleaning (i.e., cleaning and filtering 324), Normalization 322, and Transformation 320. Each of these steps 320-324 are described in further detail below.

Cleaning & Filtering 324

Some filtering may be performed during data acquisition 302. In particular, data rows with "Value" equal N/A may be excluded, and rows with Value=0 (e.g., in the case when the test objective is the trailing value) may not be touched. Further filtering (temporary filtering) by N/A values in columns may also be performed.

In addition, if the share of zero-value/false-value for "Value"/"Test objective goal click" is too big (e.g., for example more than 80%), embodiments of the invention may decide whether to stop and say that it may not be possible to create rules (up to 3 levels), or continue and try to find more complex rules (5 or more levels).

The cleaning and filtering 324 may further check for row duplicates (i.e. rows with the same contact ID). Aggregation by contacts in visits with first time exposure may also be conducted. Accordingly, it may be expected that there are no rows with duplicate contact IDs.

Once the filtering is complete, the data may be cleaned. Cleaning may only be applied for the whole dataset for the combination 404A-404N. Cleaning may remove columns from dataset if the rows/combinations 404A-404N contain shared non-empty/non-zero/non-false value less than some cutoff point (e.g. 20%). For example, if a set (e.g., all) of the rows share a column with the same non-zero value that is below a determined threshold, that column may be deleted. Further, in one or more embodiments, cleaning removes columns across all rows/combinations 404A-404N.

Normalization 322

Normalization 322 may be applied to numerical input variables such as visit number and 'value earned before exposure'. One or more embodiments of the invention may utilize a standard way of normalizing numeric values. However, some categorical variables may be expressed by numbers, but may not be normalized. Embodiments of the invention may watch for truly numerical variables (where Average( ) and Sum( ) make sense). Further, normalization 322 may always apply when all data is already aggregated, because it will operate across all values in a particular column.

Transformation 320

Transformation 320 may not be critical for embodiments of the invention but can improve performance or outcome. There are two different applications: in computing; and in statistics.

In computing—transformation 320 can be used for simplifying further usage of data or optimizing for computing performance. For example, campaign/page/behavior pattern GUIDs may be encoded as numbers to speed up comparisons and filtering (while still treating them as categorical variables). Another possible transformation is to create lookup indices. Trivial transformations may also be applied during data acquisition 302, such as:

Lowercasing text or trimming extra spaces,

Changing ISO (International Organization for Standardization) Date to Local Time of Day or Day of Week.

In statistics—various functional transformations can be applied to data values (usually numerical) to improve accuracy, make interpretation easier, or create new semantic (for example, compute average velocity from distance and time). Embodiments of the invention may utilize a special-case transformation for the Value as test objective. For example, embodiments may change the target variable from Value to "Value better than Winner average" with the following values:

TRUE—row's 'Value after exposure' is more than the average 'Value after exposure' in Winner combination.

FALSE—row's 'Value after exposure' is less than the average 'Value after exposure' in Winner combination.

Sample Selection 326

Once preprocessed at 318, the samples of the data are split/selected at 326. In this regard, if there is a big dataset, then data could be split randomly. Randomly means picking a random sample from the dataset, for example every third row into the testing set, and the rest to the training set. However, if the dataset is not so big (e.g., below a threshold size), then the whole dataset may be utilized for training. Thus, the dataset may be split/sampled at 326 and forwarded/used as a training or testing set at 328.

Stage 3: Model Training 306

The training/testing set 328 is then used to perform the model training 306. In this regard, during model training 306, a machine learning (ML) methodology is used to train the model at 330. The model training 330 may utilize a CART 332 (classification and regression tree) implementation of an ML model 200 (described in further detail below).

When the training 330 completes, the resulting tree (e.g., tree 332) may be refined to the final set of branches, where each branch is:

Validated with the training set;
Simplified (see below);
Cut to the desired depth (e.g. three (3) conditions); and
Compared to other branches by accuracy, share and risk.

The final set of branches of a tree 332 may include the top N branches based on a variety of different techniques. The selection of the top N branches may be performed based on accuracy of prediction, share of covered data (probability of hitting the rule), and/or error/risk estimation (probability of misclassification). In this regard, the accuracy and prediction may refer to the definitions set forth in wikipedia at en.wikipedia.org/wiki/Accuracy_and_precision and en.wikipedia.org/wiki/Precision_and_recall which are incorporated by reference herein. Regardless of the technique/method used to select branches, embodiments of the invention may conduct several runs for different branches, in order to find the best one. The resulting/final branches/training model may be tested at 334 with the results of the test further verified at 336.

Simplifying the Branches

In certain cases, conditions in a tree branch of a resulting tree may be plain subsets of preceding conditions in the same branch. Such branches can be simplified to a smaller set of conditions without sacrificing the accuracy or share of covered data. For example, the desired branch may be represented as:

Country is in list (Fr, Ge, Ja, Mx, Sw)>Country is in list (Fr, Sw)>Goal is in list (G1, G4, G5)>Visits Number is less than 10>Goal is in list (G4, G5)

Such a representation provides for five (5) levels of rules, where Country and Goal variables have pairs of looser and stricter conditions. This rule can be modified to the following 3-level rule by removing redundant conditions for Country and Goals:

Country is in list (Fr, Sw)>Visits Number is less than 10>Goal is in list (G4, G5)

Verification

Testing 334 may show that all the branches have low accuracy or coverage, and in this case the user may need to accept or decline rules manually. This will frequently happen when the calculated decision tree has too low or too high depth. In this regard, RPART/CART 332 (i.e., Recursive PARTitioning/Classification and Regression Trees) may generate very shallow trees when data quality is low (very homogeneous data), and in this case, coverage of the rules may be low. In the case of too diverse data, RPART may generate a very deep tree, and trimming the tree to a depth of three (3) will result in low accuracy.

Stage 4: Deployment 308

The output from model training 306 consists of a tested 334 and verified 336 set of branches of a raw tree that represents different potential options for personalization/personalization rules. To deploy the model at 308, the raw tree from the machine learning/model training at 306 is converted into a set of usable personalization rules 338. These rules 338 are exposed in the user interface for analysis/selection (e.g., via diagrams 340), may be stored in a reporting database 342 that may be used to easily apply the rules to personalize and publish 344 a website from the user interface.

Machine Learning (ML) Model

In step 306, many different machine learning (ML) models may be utilized to implement embodiments of the invention, and the invention is not intended to be limited to any specific ML implementation.

Figure 5:
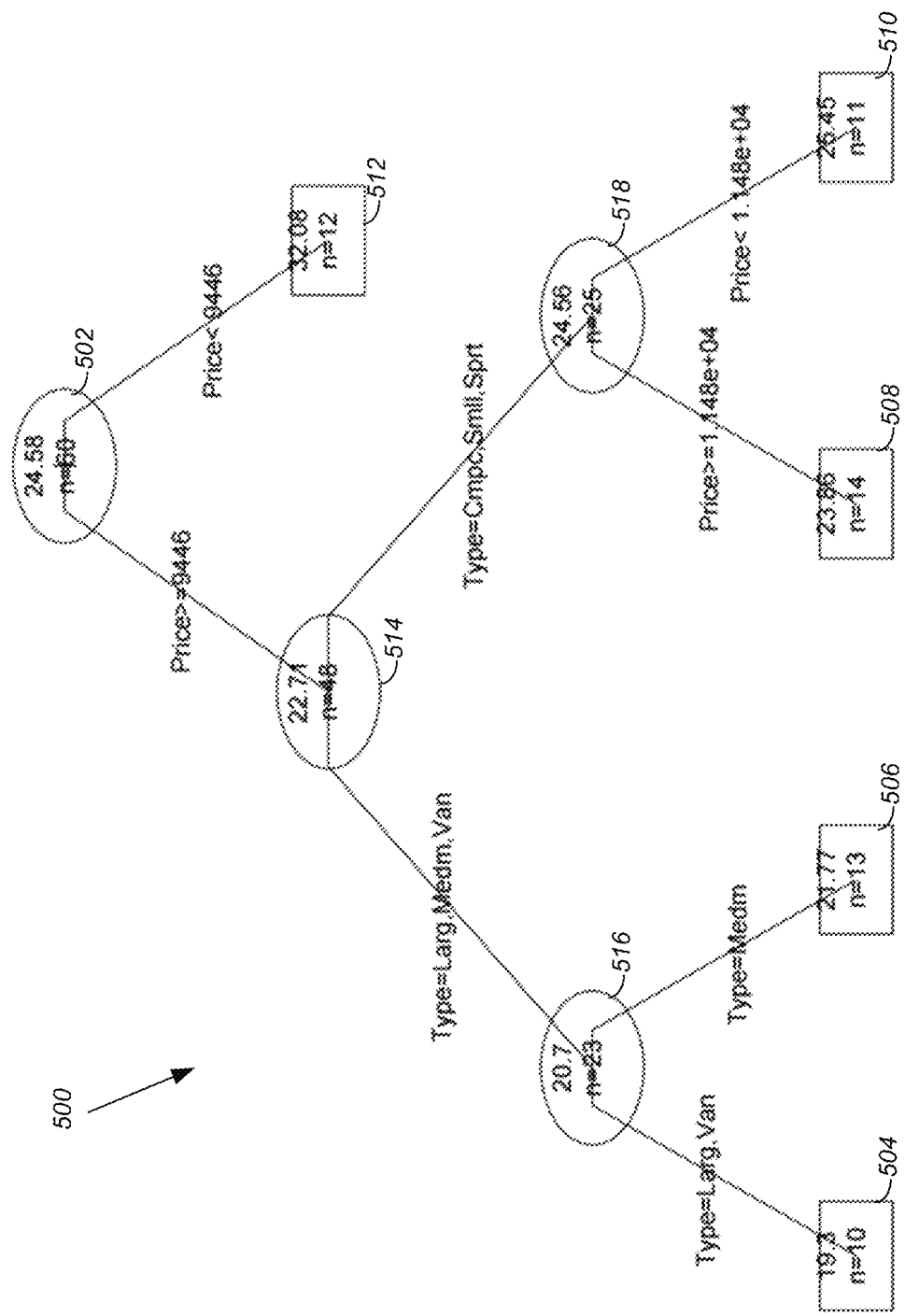
FIG. 5 illustrates an exemplary CART (classification and regression tree) implementation of an ML model in accordance with one or more embodiments of the invention.

For illustration purposes, FIG. 5 illustrates an exemplary CART (classification and regression tree) implementation of an ML model 200 in accordance with one or more embodiments of the invention. Alternative ML models/CART trees may include those identified in U.S. Pat. Nos. 7,113,917 and 8,527,869, which are incorporated by reference herein. Another alternative ML model/CART tree that may be used in accordance with embodiments of the invention is that offered by SALFORD SYSTEMS and described at salford-systems.com/products/cart.

Referring again to FIG. 5, as illustrated, a decision tree 500 is created and may be used to represent different potential personalization rules. The tree 500 is often a binary tree where the root node 502 represents a single input variable (x) and a split point on that variable. The circle nodes 502 and 512-518 provide binary conditions. The leaf nodes 504, 506, 508, 510, and 512 contain an output variable (y) that is used to make a prediction. Thus, for example, the exemplary decision tree 500 of FIG. 5 contains two inputs, price and type. At node 502, if the price is less than 9446, then the prediction is 32.08 and n=12 at node 512. If the price is greater than or equal to 9446, the decision tree 500 proceeds to node 514 for an evaluation of an additional binary condition of the type. If the type is large, medium, or van, then the tree proceeds to node 516 with a further evaluation of the type. If the type is large or van, then the prediction is identified in leaf node 504. If the type is medium, then the prediction is identified in leaf node 506. Similarly, at node 514, if the type is determined to be compact, small, or sport, the decision tree branches to node 518 with a further evaluation of price that determines whether the prediction is leaf node 508 or leaf node 510.

To create the decision tree 500, a methodology is run for all visitors (e.g., to a website) that were presented each of the experiences in a test. Each node 502 of the tree 500 predicts key performance index (KPI) values, and the node 512-518 with the positive predicted effect is selected. Further, the nodes 502-518 are converted to personalization rules. Distinctive features in the data acquisition 302, data processing 304, model training 306, and deployment 308 of embodiments of the invention include the removal of unnecessary parts and features (e.g., from the decision tree processing), the ability to bind data to a particular database, and the evaluation of nodes based on specific KPIs (e.g., goals or engagement values).

In accordance with embodiments of the invention, various traits may be used in/to train the model 500. The inputs to model 500 may consist of such traits. In this regard, the inputs/traits consist of the parameters that are taken into consideration in order to provide the predictions/personalization rules (e.g., for a website). In one or more embodiments, exemplary advantageous information includes data relating to visits and personalization patterns (e.g., personas and profiles). Visitor profile based traits may relate to a behavioral profile of the user that may be maintained via profile cards, for example. In particular, a visitor's profile on a website may include the pages the visitor has visited, the goals triggered, time spent on a site, the campaigns the visitor was exposed to/involved in, similarity to other user profiles, etc.

In view of the above, specific examples of traits that may be used in the model 500 include campaigns triggered during the visit before the test was presented, the landing page of the visit before the test was presented, goals/events/outcomes triggered in this or previous visits within the last 30 days, visitor's matching profile card before the test was presented, the visit number (e.g., the number of visits), the GeoIP (i.e., the geographical location of/associated with an IP address) parameters if geo-location services are turned on (e.g., country and/or region), day of the week, and visitor device parameters such as the device type and/or operating system.

Figure 6:
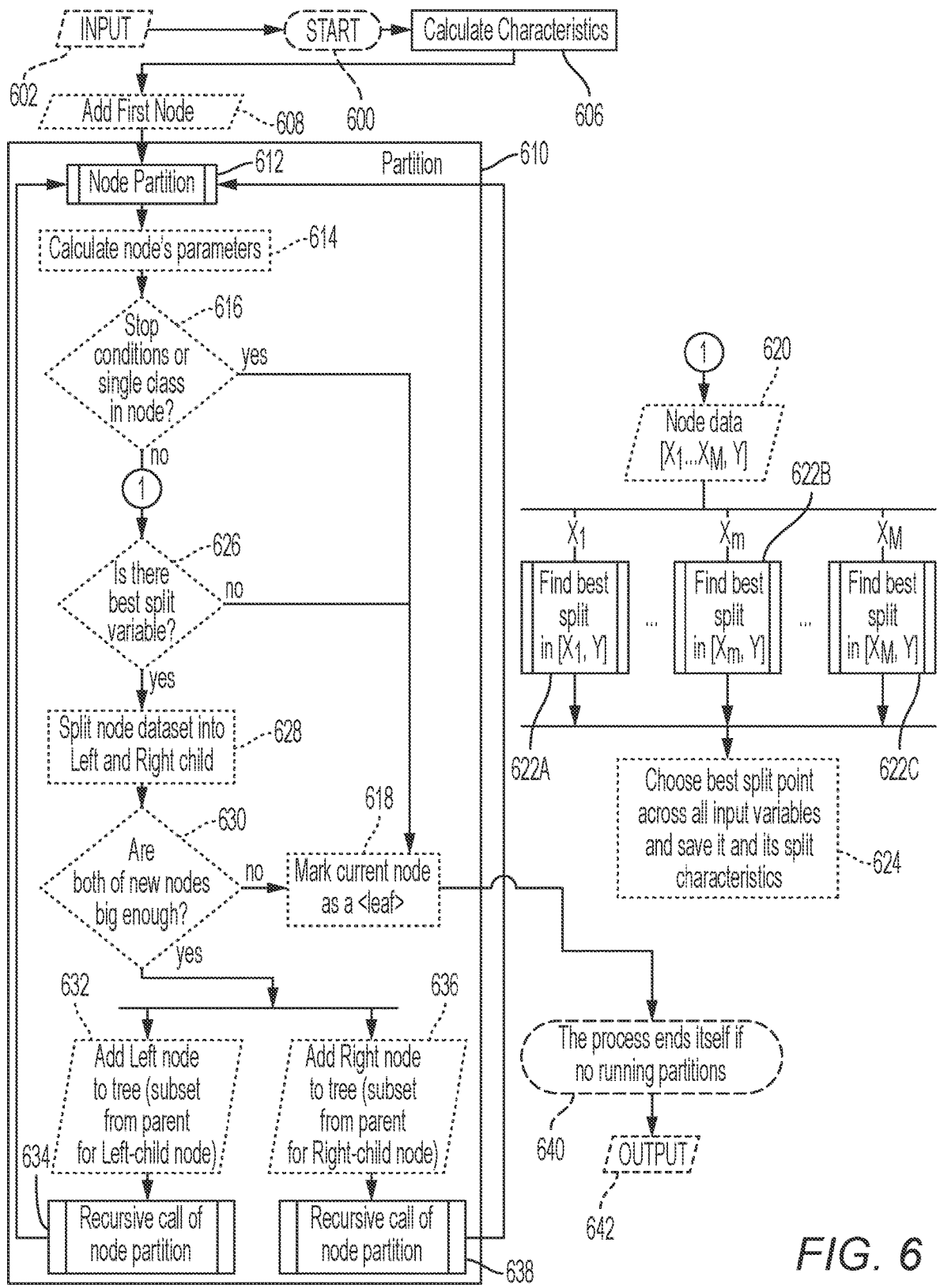
FIG. 6 illustrates the logical flow for conducting model training and developing a decision tree in accordance with one or more embodiments of the invention.

FIG. 6 illustrates the logical flow for conducting the model training at 306 and developing a decision tree in accordance with one or more embodiments of the invention.

The method starts at 600 where input 602 is received. The input 602 may include a pre-processed dataset, stop conditions, and/or loss matrix. At 606, the main dataset's characteristics are calculated (e.g., target classes and priors [priors are estimates of the overall relative frequency for each class of the target/dependent variable prior to knowing anything about the values of the input/independent variables]). At step 608, the first node is added to the tree. At this step, the first node (e.g., the root node) is equal to/consists of the entire input dataset 602.

Once the root node has been added at 608, the partitioning of the node at 610 can proceed. The function for partitioning the node at 610 is node partition function 612. The node's parameters are calculated at step 614. At step 616 a determination is made regarding whether the parameters include a stop condition or if there is a single class in the node. In this regard, stop conditions may include: (1) If the node size is less than the predefined minimum number of observations that must exist in a node in order for a split to be attempted (minsplit—it can be specified by the end user and stored in a config file); and/or (2) If the depth of the new node is more than the predefined maximum depth of any node of the final tree, with the root node counted as depth 0. (maxdepth—it can be specified by end user and stored in config file). As used herein, a single class in the node is defined as when the value/class of a target variable is the same for all observations from this node. Thus, if there is a stop condition or the node has a single class, then the current node is marked as a leaf node at 618.

If there is neither a stop condition nor a single class in the node, the node must be split. First, the node data 620 is evaluated. The node data consists of $[X_1 \ldots X_M, Y]$, where $X_m$, m=1, . . . M are input variables and Y is the output/target variable. The task becomes how to identify the best split point across the input variables. In one or more embodiments, the best split point for each input variable is identified/found in 622A, 622B, and 622C. Thereafter, at 624, the best split point across all input variables 622A-622C is chosen/identified and saved (along with the split characteristics.

Figure 7:
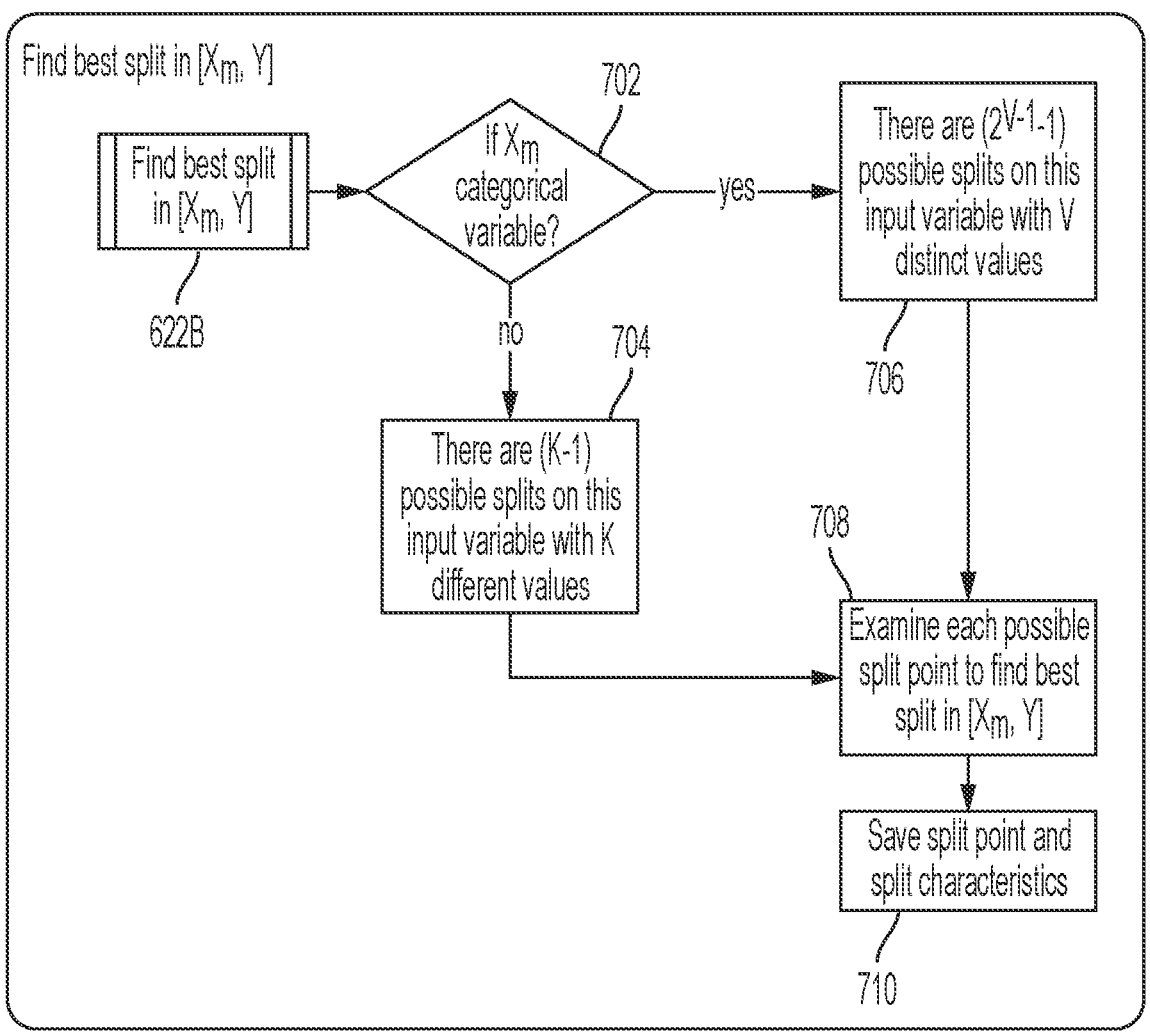
FIG. 7 illustrates the logical flow for portioning a node in a ML model in accordance with one or more embodiments of the invention.

FIG. 7 illustrates the logical flow for finding the best split in $[X_m, Y]$ (i.e., the best split point for input variable $X_m$ in accordance with one or more embodiments of the invention. At step 702, a determination is made regarding whether $X_m$ is a categorical variable. If $X_m$ is not a categorical variable, then there are (K−1) possible splits on this input variable with K different values (as seen at 704). However, if $X_m$ is a categorical variable, then there are $(2^{V-1}-1)$ possible splits on this input variable with V distinct values (as seen at 706). As used herein, a categorical variable is a variable that can take on one of a limited, and usually a fixed number of possible values, assigning each individual or other unit of observation to a particular group or nominal category on the basis of some qualitative property. Examples of categorical variables include "gender"—male/female. Examples of non-categorical/numerical variable include "number of floors"—0, 1, 2, 20, . . . .

At 708, each possible split point (for input variable $X_m$) is examined to find the best split in $[X_m, Y]$. In this regard, each split point for the input variable $X_m$ may be split into two (2) new child datasets (left and right) and the quality of the split is examined. In one or more embodiments, the best split is identified as the split that provides the best improvement compared to other splits (e.g., the Gini impurity index may be used to determine the improvements to be compared). Once the best split/split point has been identified for the input variable $X_m$, the split point and its characteristics are saved at 710. A similar process is completed for all input variables (i.e., 622A, 622b, and 622C). Thereafter, at step 624, the best split point across all input variables 622A-C is selected and saved (along with its split characteristics).

Returning to FIG. 6, the process continues at 626 with a determination of whether there is a best split variable based on selected calculated metrics. For example, a Gini impurity may be used as the metric. If there is not a best split variable, the process continues at step 618 by marking the current node as a leaf. If there is a best split variable, the current node's dataset is split into two subsets in split point (a left and right child) at step 628.

At step 630, a determination is made regarding whether both the new nodes are big enough. For example, a size of each new node may be required to be more than the predefined minimum number of observations in any node (minbucket). By default minbucket=round(minsplit/3) but could be specified by end user in a config file. If the nodes are not big enough, the current node as marked as a leaf at 618. However, both new nodes are sufficiently large enough, the left node is added to the tree (i.e., the subset from the parent for the left-child node) at 632, and a recursive call of the node partition begins at 634 by returning to 612. Similarly, if both new nodes are sufficiently large enough, the right node is also added to the tree (i.e., the subset from the parent for the right-child node) at step 636 and a recursive call of this node partition begins at 638 by returning to 612.

Once all the nodes are marked as leaf nodes via step 618, the process ends as long as there are no more running partitions at 640. The results are output at step 642. The output 642 consists of the list of nodes with the predicted class, the split points, and the node characteristics.

To better understand the process of step 610 Partition, an example may be useful. For a shopping website which registers a contact's visit frequency, number of email subscriptions, average purchase price, frequency of purchases per year and membership level, Table A illustrates exemplary node data with depth equal 2 (i.e., partition was started a third time).

TABLE A

| $X_1$ contact's visit frequency | $X_2$ number of email subscriptions | $X_3$ average purchase price | $X_4$ frequency of purchases per year | Y membership level |
|---|---|---|---|---|
| non-frequent | 0 | cheap | low | bronze |
| non-frequent | 1 | cheap | medium | bronze |
| frequent | 1 | cheap | medium | silver |
| frequent | 0 | cheap | low | bronze |
| non-frequent | 1 | cheap | medium | bronze |
| non-frequent | 0 | moderate | medium | silver |
| frequent | 1 | moderate | medium | silver |
| frequent | 1 | expensive | high | gold |
| non-frequent | 2 | expensive | medium | gold |
| frequent | 2 | expensive | high | gold |

In Table A, the input variables are $[X_1 \ldots X_M]$ (i.e., contact's visit frequency, number of email subscriptions, average purchase price, frequency of purchases per year) and the target variable is Y (i.e., membership level). Stop conditions are next: minsplit=3, minbucket=2 and maxdepth=5.

Once the node's parameters are calculated at step 614 a determination is made whether the node is allowed to further split according to stop conditions at step 616. As the node in Table A contains 10 observations and 10>3 and the node's depth 3<5, and the target variable membership level contains more than 1 class, a further split is viable.

From table A, we take out each input variable and its associate target classes. If we have M input variables, then we will take out M subsets of node data (steps 622A, 622B, 622C).

For example, take out average purchase price (step 622B). Table B below shows the average purchase price and the corresponding classes in target variable Y.

TABLE B

| $X_3$ average purchase price | Y membership level |
|---|---|
| cheap | bronze |
| cheap | bronze |
| cheap | silver |
| cheap | bronze |
| cheap | bronze |
| moderate | silver |
| moderate | silver |
| expensive | gold |
| expensive | gold |
| expensive | gold |

Table B could be rewritten as counts by target classes and input variable. Table C provides for such counts:

TABLE C

| | | input variable values | | |
|---|---|---|---|---|
| | | cheap | expensive | moderate |
| Classes | bronze | 4 | 0 | 0 |
| | gold | 0 | 3 | 0 |
| | silver | 1 | 0 | 2 |

Since average purchase price is a categorical variable with three different categorical values (cheap, moderate, and expensive), at step 706 there are ($2^{V-1}-1$) possible splits on the input variable "average purchase price" where V is the number of distinct values, i.e., V=3. The total number of possible split combinations are $2^{(3-1)}-1=3$. Each possible split point is examined to find the best split. Thus, the goal is to find the best split in the categorical variable average purchase price ($X_3$).

Table D provides an example of the different split combinations that are split into the different subsets for the recursive partitioning. Accordingly, L comprises the data rows that go to the left subset and R provides the data rows that go to the right subset.

TABLE D

| | | input variable values | | |
|---|---|---|---|---|
| | | cheap | expensive | moderate |
| split combs | split comb 1 | L | R | R |
| | split comb 2 | R | L | R |
| | split comb 3 | R | R | L |

In a different example, if there were four (4) different categorical values A, B, C, and D, then the total number of possible split combinations would be $2^{(4-1)}-1=7$. In such an instance, the different possible split combinations would be:
ABCD
LLLR
LLRR
LLRL
LRRL
LRRR
LRLR
LRLL Returning to the former example, the first split combination from Table D (for the average purchase price categorical variable) is illustrated in Table E:

TABLE E

| | | Left (cheap) | Right (expensive + moderate) |
|---|---|---|---|
| Classes | bronze | 4 | 0 + 0 = 0 |
| | gold | 0 | 3 + 0 = 3 |
| | silver | 1 | 0 + 2 = 2 |

The counts in Table E are calculated by target classes in the Left and Right child (based on Table C) for the split combination. Returning to FIG. 6, in determining the best split at 622B (as described in FIG. 7), the Gini impurity and its improvement for the split combination are calculated.

If one calculates the Gini impurity and its improvement for each split combination in "average purchase price", it may be determined that the best split will be for split combination 2 in variable "average purchase price".

The same steps 702-710 should be repeated for the rest of input variables (i.e., contact's visit frequency, number of email subscriptions, frequency of purchases per year).

So next we are trying to find the best split in the numerical variable "Number of email subscriptions". Table F illustrates the different "Number of email subscriptions" variables:

TABLE F

| $X_2$ Number of email subscriptions | Y membership level |
|---|---|
| 0 | bronze |
| 1 | bronze |
| 1 | silver |
| 0 | bronze |
| 1 | bronze |
| 0 | silver |
| 1 | silver |
| 1 | gold |
| 2 | gold |
| 2 | gold |

From the "Number of email subscriptions" list of Table F, one may count by target classes and input variable. Table J illustrates such counts:

TABLE G

| | | input variable values | | |
|---|---|---|---|---|
| | | 0 | 1 | 2 |
| Classes | bronze | 2 | 2 | 0 |
| | gold | 0 | 1 | 2 |
| | silver | 1 | 2 | 0 |

For the numerical variable "Number of email subscriptions", there are three (3) different values (0, 1, 2), so K=3. Therefore, the total number of possible split points is 3−1=2 and these splits are illustrated in Table H:

TABLE H

| | To Left | To Right |
|---|---|---|
| Point 1 | "Number of email subscriptions" value ≤ 0 | the rest |
| Point 2 | "Number of email subscriptions" value ≤ 1 | the rest |

Table I further illustrates these split points:

TABLE I

| | | input variable values | | |
|---|---|---|---|---|
| | | 0 | 1 | 2 |
| split points | split point 1 | L | R | R |
| | split point 2 | L | L | R |

If one has 3, 1, 5, and 10 as numerical values, then there would be three (3) options for split points as illustrated in Table J:

TABLE J

| | Values To Left | Values To Right |
|---|---|---|
| Point 1 | 1 | 3, 5, 10 |
| Point 2 | 1, 3 | 5, 10 |
| Point 3 | 1, 3, 5 | 10 |

From Tables G and H, one may calculate counts for target classes in the Left and Right child for split point 1. Thereafter, the Gini impurity and its improvement may be calculated for this split point. Table K illustrates exemplary calculated counts by target classes:

TABLE K

| Split point 1 | | Left | Right |
|---|---|---|---|
| Classes | bronze | 2 | 2 + 0 = 2 |
| | gold | 0 | 1 + 2 = 3 |
| | silver | 1 | 2 + 0 = 2 |

If one calculates the Gini impurity and its improvement for each split point in "number of email subscriptions", it may be determined that the best split will be for split point 2.

After finding best split combination/point (step 710) for each input variable, one need to choose best split variable at step 624. The best split variable is variable that brings max Gini improvement across all input variables.

Accordingly, in the example, the best split variable is the contact's visit frequency with split combination 2, so two new nodes for further splitting (e.g., based on Table A and D) are:

| Left Node | | | | |
|---|---|---|---|---|
| $X_1$ contact's visit frequency | $X_2$ number of email subscriptions | $X_3$ average purchase price | $X_4$ frequency of purchases per year | Y membership level |
| frequent | 1 | expensive | high | gold |
| non-frequent | 2 | expensive | medium | gold |
| frequent | 2 | expensive | high | gold |

| Right Node | | | | |
|---|---|---|---|---|
| $X_1$ contact's visit frequency | $X_2$ number of email subscriptions | $X_3$ average purchase price | $X_4$ frequency of purchases per year | Y membership level |
| non-frequent | 0 | cheap | low | bronze |
| non-frequent | 1 | cheap | medium | bronze |
| frequent | 1 | cheap | medium | silver |
| frequent | 0 | cheap | low | bronze |
| non-frequent | 1 | cheap | medium | bronze |
| non-frequent | 0 | moderate | medium | silver |
| frequent | 1 | moderate | medium | silver |

In other words, at 632-638, there are two child subsets that are received:

$[X_1 \ldots X_M, Y]_L$ 632; and $[X_1 \ldots X_M, Y]_R$ 636.

The process then repeats recursively via steps 634 and 638 with the Left and Right Nodes.

Hardware Environment

Figure 8:
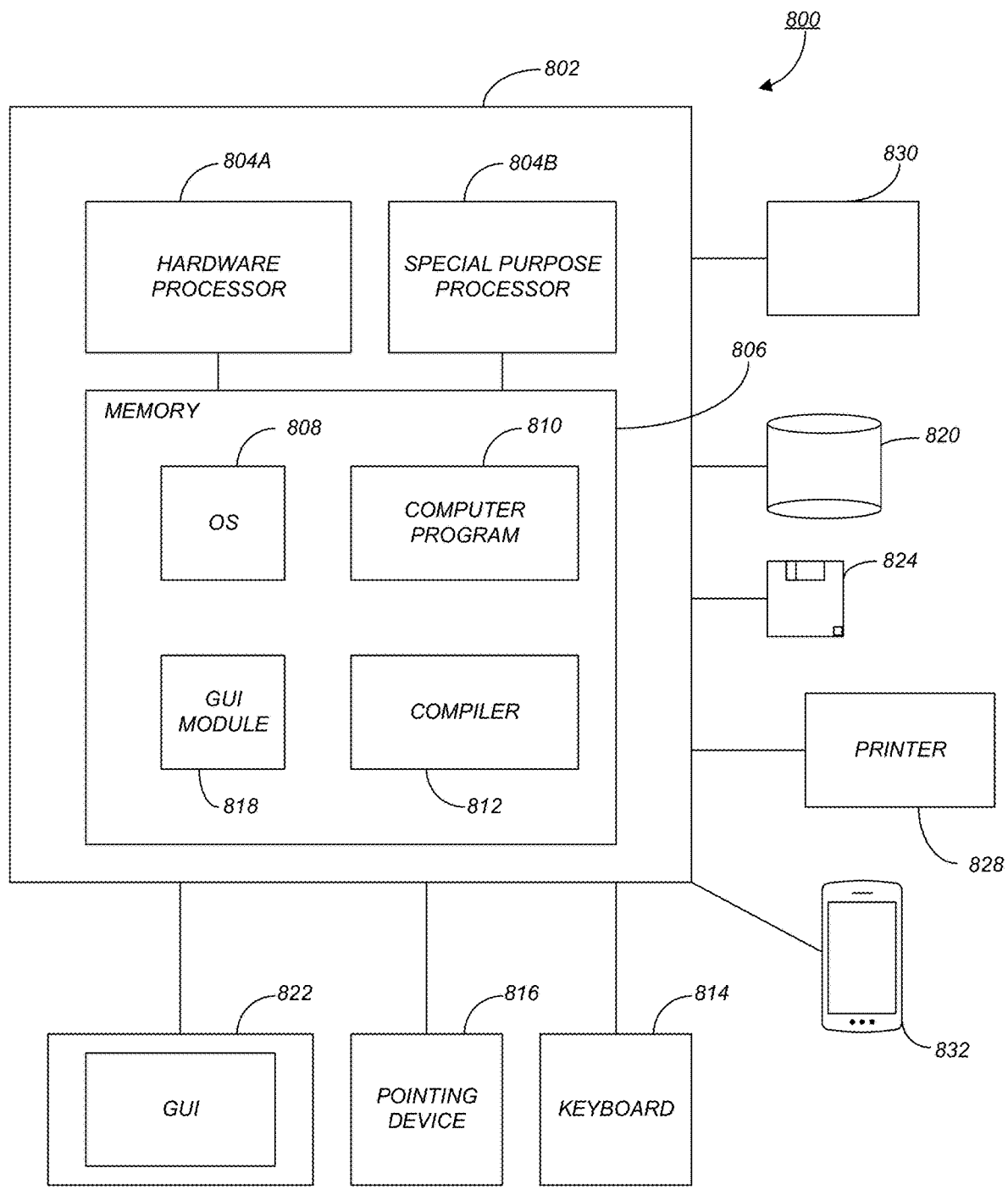
FIG. 8 is an exemplary hardware and software environment used to implement one or more embodiments of the invention.

FIG. 8 is an exemplary hardware and software environment 800 used to implement one or more embodiments of the invention. The hardware and software environment includes a computer 802 and may include peripherals. Computer 802 may be a user/client computer, server computer, or may be a database computer. The computer 802 comprises a hardware processor 804A and/or a special purpose hardware processor 804B (hereinafter alternatively collectively referred to as processor 804) and a memory 806, such as random access memory (RAM). The computer 802 may be coupled to, and/or integrated with, other devices, including input/output (I/O) devices such as a keyboard 814, a cursor control device 816 (e.g., a mouse, a pointing device, pen and tablet, touch screen, multi-touch device, etc.) and a printer 828. In one or more embodiments, computer 802 may be coupled to, or may comprise, a portable or media viewing/listening device 832 (e.g., an MP3 player, IPOD, NOOK, portable digital video player, cellular device, personal digital assistant, etc.). In yet another embodiment, the computer 802 may comprise a multi-touch device, mobile phone, gaming system, internet enabled television, television set top box, or other internet enabled device executing on various platforms and operating systems.

In one embodiment, the computer 802 operates by the hardware processor 804A performing instructions defined by the computer program 810 under control of an operating system 808. The computer program 810 and/or the operating system 808 may be stored in the memory 806 and may interface with the user and/or other devices to accept input and commands and, based on such input and commands and the instructions defined by the computer program 810 and operating system 808, to provide output and results.

Output/results may be presented on the display 822 or provided to another device for presentation or further processing or action. In one embodiment, the display 822 comprises a liquid crystal display (LCD) having a plurality of separately addressable liquid crystals. Alternatively, the display 822 may comprise a light emitting diode (LED) display having clusters of red, green and blue diodes driven together to form full-color pixels. Each liquid crystal or pixel of the display 822 changes to an opaque or translucent state to form a part of the image on the display in response to the data or information generated by the processor 804 from the application of the instructions of the computer program 810 and/or operating system 808 to the input and commands. The image may be provided through a graphical user interface (GUI) module 818. Although the GUI module 818 is depicted as a separate module, the instructions performing the GUI functions can be resident or distributed in the operating system 808, the computer program 810, or implemented with special purpose memory and processors.

In one or more embodiments, the display 822 is integrated with/into the computer 802 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD), portable/handheld game/music/video player/console devices (e.g., IPOD TOUCH, MP3 players, NINTENDO 3DS, PLAYSTATION PORTABLE, etc.), touch tables, and walls (e.g., where an image is projected through acrylic and/or glass, and the image is then backlit with LEDs).

Some or all of the operations performed by the computer 802 according to the computer program 810 instructions may be implemented in a special purpose processor 804B. In this embodiment, some or all of the computer program 810 instructions may be implemented via firmware instructions stored in a read only memory (ROM), a programmable read only memory (PROM) or flash memory within the special purpose processor 804B or in memory 806. The special purpose processor 804B may also be hardwired through circuit design to perform some or all of the operations to implement the present invention. Further, the special purpose processor 804B may be a hybrid processor, which includes dedicated circuitry for performing a subset of functions, and other circuits for performing more general functions such as responding to computer program 810 instructions. In one embodiment, the special purpose processor 804B is an application specific integrated circuit (ASIC).

The computer 802 may also implement a compiler 812 that allows an application or computer program 810 written in a programming language such as C, C++, Assembly, SQL, PYTHON, PROLOG, MATLAB, RUBY, RAILS, HASKELL, or other language to be translated into processor 804 readable code. Alternatively, the compiler 812 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 810 accesses and manipulates data accepted from I/O devices and stored in the memory 806 of the computer 802 using the relationships and logic that were generated using the compiler 812.

The computer 802 also optionally comprises an external communication device such as a modem, satellite link, Ethernet card, or other device for accepting input from, and providing output to, other computers 802.

In one embodiment, instructions implementing the operating system 808, the computer program 810, and the compiler 812 are tangibly embodied in a non-transitory computer-readable medium, e.g., data storage device 820, which could include one or more fixed or removable data storage devices, such as a zip drive, floppy disc drive 824, hard drive, CD-ROM drive, tape drive, etc. Further, the operating system 808 and the computer program 810 are comprised of computer program 810 instructions which, when accessed, read and executed by the computer 802, cause the computer 802 to perform the steps necessary to implement and/or use the present invention or to load the program of instructions into a memory 806, thus creating a special purpose data structure causing the computer 802 to operate as a specially programmed computer executing the method steps described herein. Computer program 810 and/or operating instructions may also be tangibly embodied in memory 806 and/or data communications devices 830, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 802.

Figure 9:
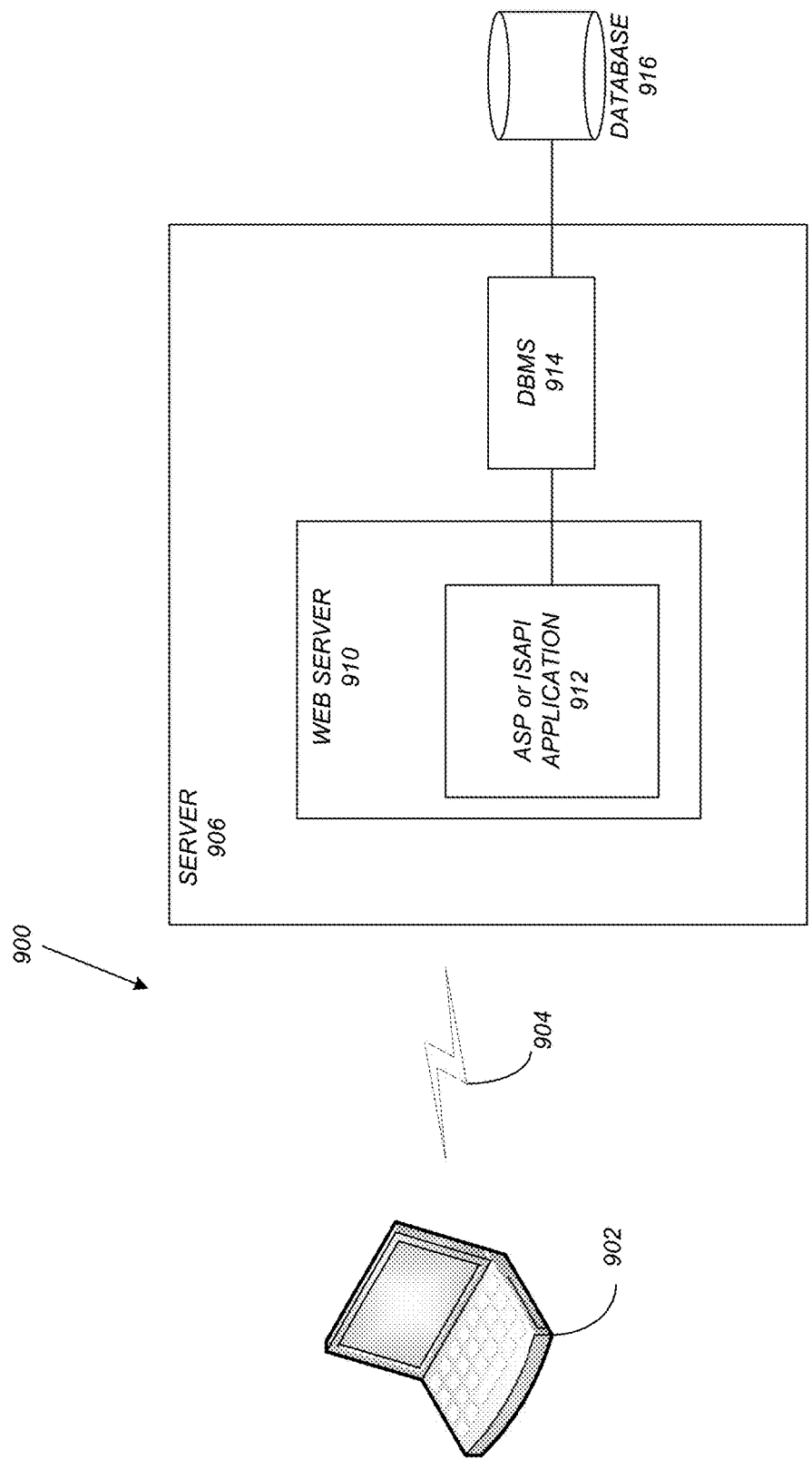
FIG. 9 schematically illustrates a typical distributed/cloud-based computer system using a network to connect client computers to server computers in accordance with one or more embodiments of the invention.

FIG. 9 schematically illustrates a typical distributed/cloud-based computer system 900 using a network 904 to connect client computers 902 to server computers 906. A typical combination of resources may include a network 904 comprising the Internet, LANs (local area networks), WANs (wide area networks), SNA (systems network architecture) networks, or the like, clients 902 that are personal computers or workstations (as set forth in FIG. 8), and servers 906 that are personal computers, workstations, minicomputers, or mainframes (as set forth in FIG. 8). However, it may be noted that different networks such as a cellular network (e.g., GSM [global system for mobile communications] or otherwise), a satellite based network, or any other type of network may be used to connect clients 902 and servers 906 in accordance with embodiments of the invention.

A network 904 such as the Internet connects clients 902 to server computers 906. Network 904 may utilize ethernet, coaxial cable, wireless communications, radio frequency (RF), etc. to connect and provide the communication between clients 902 and servers 906. Further, in a cloud-based computing system, resources (e.g., storage, processors, applications, memory, infrastructure, etc.) in clients 902 and server computers 906 may be shared by clients 902, server computers 906, and users across one or more networks. Resources may be shared by multiple users and can be dynamically reallocated per demand. In this regard, cloud computing may be referred to as a model for enabling access to a shared pool of configurable computing resources.

Clients 902 may execute a client application or web browser and communicate with server computers 906 executing web servers 910. Such a web browser is typically a program such as MICROSOFT INTERNET EXPLORER, MOZILLA FIREFOX, OPERA, APPLE SAFARI, GOOGLE CHROME, etc.

Further, the software executing on clients 902 may be downloaded from server computer 906 to client computers 902 and installed as a plug-in or ACTIVEX control of a web browser. Accordingly, clients 902 may utilize ACTIVEX components/component object model (COM) or distributed COM (DCOM) components to provide a user interface on a display of client 902. The web server 910 is typically a program such as MICROSOFT'S INTERNET INFORMATION SERVER.

Web server 910 may host an Active Server Page (ASP) or Internet Server Application Programming Interface (ISAPI) application 912, which may be executing scripts. The scripts invoke objects that execute business logic (referred to as business objects). The business objects then manipulate data in database 916 through a database management system (DBMS) 914. Alternatively, database 916 may be part of, or connected directly to, client 902 instead of communicating/obtaining the information from database 916 across network 904. When a developer encapsulates the business functionality into objects, the system may be referred to as a component object model (COM) system. Accordingly, the scripts executing on web server 910 (and/or application 912) invoke COM objects that implement the business logic. Further, server 906 may utilize MICROSOFT'S TRANSACTION SERVER (MTS) to access required data stored in database 916 via an interface such as ADO (Active Data Objects), OLE DB (Object Linking and Embedding Database), or ODBC (Open DataBase Connectivity).

Generally, these components 900-916 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 902 and 906 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 902 and 906. Embodiments of the invention are implemented as a software application on a client 902 or server computer 906. Further, as described above, the client 902 or server computer 906 may comprise a thin client device or a portable device that has a multi-touch-based display.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, content delivery network (CDN), or stand-alone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for generating personalized digital content, comprising:
    performing multiple content tests by presenting, across multiple different channels, different variants of content to a set of different consumers of one or more consumers;
    generating and training a machine learning (ML) model based on an analysis of results of the multiple content tests;
    outputting, based on the ML model, personalization rules, wherein each personalization rule specifies a certain variance for a defined set of facts, and wherein the defined set of facts applies to both websites and across the multiple different channels;
    exposing the personalization rules and the different variants of content to an administrative user, wherein the administrative user selects a winning variant to use as a default and one or more of the personalization rules to personalize consumer experiences;
    receiving a request for content from a requesting consumer of the one or more consumers;
    based on similarities between the defined set of facts and the requesting consumer, automatically determining an applicable personalization rule of the selected one or more personalization rules; and
    personalizing and delivering the content to the requesting consumer based on the determined applicable personalization rule, wherein the content is personalized and delivered to both websites and the multiple different channels.

2. The computer-implemented method of claim 1, wherein the performing multiple content tests further comprises:
    collecting the results of the multiple content tests, wherein the results comprise mapping from input variables to target variables; and preprocessing the results, wherein the preprocessing comprises transforming, normalizing, and cleaning and filtering the collected results on a per mapping basis.

3. The computer-implemented method of claim 2, wherein a threshold number of results are accumulated prior to the preprocessing.

4. The computer-implemented method of claim 2, wherein the cleaning and filtering comprises:
reducing data in the collected results by removing duplicate mappings and attributes with shared values.

5. The computer-implemented method of claim 2, wherein the normalization comprises:
normalizing numeric values.

6. The computer-implemented method of claim 2, wherein the transforming comprises:
transforming the collected results into a different form to optimize the collected results for computing performance.

7. The computer-implemented method of claim 1, wherein the generating the ML model utilizes a classification and regression tree (CART).

8. The computer-implemented method of claim 7, wherein the generating further comprises:
building the CART based on the results of the multiple content tests, wherein:
each node of the CART comprises input variables and output data; and
when generating the CART, a node is partitioned based on an evaluation of split points determined by the input variables.

9. The computer-implemented method of claim 1, wherein the personalizing and delivering comprises:
publishing a website that is personalized based on the requesting consumer.

10. The computer-implemented method of claim 1, wherein the multiple different channels comprises an internet of things channel.

11. A computer-implemented system for generating personalized digital content comprising:
(a) a computer comprising a processor and a memory;
(b) a machine learning (ML) module executed by the processor, wherein the ML module:
(1) performs multiple content tests by presenting, across multiple different channels, different variants of content to a set of different consumers of one or more consumers;
(2) generates and trains a ML model based on an analysis of results of the multiple content tests;
(3) outputs, based on the ML model, personalization rules, wherein each personalization rule specifies a certain variance for a defined set of facts, and wherein the defined set of facts applies to both websites and across the multiple different channels; and
(4) exposes the personalization rules and the different variants of content to an administrative user, wherein the administrative user selects a winning variant to use as a default and one or more of the personalization rules to personalize consumer experiences; and (c) a personalization engine executed by the processor, wherein the personalization engine:
(1) receives a request for content from a requesting consumer of the one or more consumers;
(2) based on similarities between the defined set of facts and the requesting consumer, automatically determining an applicable personalization rule of the selected one or more personalization rules; and
(3) personalizes and delivers the content to the requesting consumer based on the determined applicable personalization rule, wherein the content is personalized and delivered to both websites and the multiple different channels.

12. The computer-implemented system of claim 11, wherein the performing multiple content tests further comprises:
collecting the results of the multiple content tests, wherein the results comprise mapping from input variables to target variables; and
preprocessing the results, wherein the preprocessing comprises transforming, normalizing, and cleaning and filtering the collected results on a per mapping basis.

13. The computer-implemented system of claim 12, wherein a threshold number of results are accumulated prior to the preprocessing.

14. The computer-implemented system of claim 12, wherein the cleaning and filtering comprises:
reducing data in the collected results by removing duplicate mappings and attributes with shared values.

15. The computer-implemented system of claim 12, wherein the normalization comprises:
normalizing numeric values.

16. The computer-implemented system of claim 12, wherein the transforming comprises:
transforming the collected results into a different form to optimize the collected results for computing performance.

17. The computer-implemented system of claim 11, wherein the generating the ML model utilizes a classification and regression tree (CART).

18. The computer-implemented system of claim 17, wherein the generating further comprises:
building the CART based on the results of the multiple content tests, wherein:
each node of the CART comprises input variables and output data; and
when generating the CART, a node is partitioned based on an evaluation of split points determined by the input variables.

19. The computer-implemented system of claim 11, wherein the personalizing and delivering comprises:
publishing a website that is personalized based on the requesting consumer.

20. The computer-implemented system of claim 11, wherein the multiple different channels comprises an internet of things channel.

* * * * *